(12) United States Patent  
Waugh et al.

(10) Patent No.: US 7,941,584 B2  
(45) Date of Patent: May 10, 2011

(54) DATA PROCESSING APPARATUS AND METHOD FOR PERFORMING HAZARD DETECTION

(75) Inventors: Alex James Waugh, Cambridge (GB); Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 70 days.

(21) Appl. No.: 12/382,939

(22) Filed: Mar. 26, 2009

(65) Prior Publication Data

US 2010/0250802 A1 Sep. 30, 2010

(51) Int. Cl.  
*G06F 13/00* (2006.01)

(52) U.S. Cl. .......................... 710/310; 710/52; 710/311

(58) Field of Classification Search ............... 710/52, 710/110, 310, 311  
See application file for complete search history.

(56) References Cited

U.S. PATENT DOCUMENTS

| | | | | |
|---|---|---|---|---|
| 6,470,445 | B1 * | 10/2002 | Arnold et al. | 712/218 |
| 2004/0225823 | A1 * | 11/2004 | Heynemann et al. | 710/310 |
| 2006/0004989 | A1 * | 1/2006 | Golla | 712/214 |
| 2006/0248319 | A1 * | 11/2006 | Kadambi | 712/234 |

\* cited by examiner

*Primary Examiner* — Glenn A Auve  
(74) *Attorney, Agent, or Firm* — Nixon & Vanderhye P.C.

(57) ABSTRACT

A data processing apparatus and method are provided for performing hazard detection in a series of access requests issued by processing circuitry for handling by one or more slaves. The requests include one or more write access requests to be performec by an addressed slave device. Hazard detection circuitry comprises a pending write access history storage having at least one buffer and at least one counter for keeping a record of each pending write access request. Update circuitry responds receipt of a write access request to perform an update process to identify that write access request as a pending write access request in one of the buffers, and if the identity of another pending write access request is overwritten by that update process, to increment a count value a counter. Hazard checking circuitry is then responsive to at least a subset of the access requests to be issued by the processing circuitry, to reference pending write access history storage in order to determine whether a hazard condition occurs. The manner in which the update circuitry jses a combination of buffers aid counters to keep a record of each pending write access request provides improved performance with respect to known prior art techniques, without the hardware cost that would be associated with increasing the number of buffers.

21 Claims, 9 Drawing Sheets

WRITE ADDRESS BUFFERS

| ID | ADDRESS | VALID BIT |
|---|---|---|
| | | |
| | | |
| | | |

200

205  210  215

DATA PROCESSING APPARATUS AND METHOD FOR PERFORMING HAZARD DETECTION

BACKGROUND OF THE INVENTION

1. Field of the Invention

The present invention relates to a data processing apparatus and method for performing hazard detection in respect of a series of access requests issued by processing circuitry for handling by one or more slave devices.

2. Description of the Prior Art

Efficient data communication between master devices and slave devices in data processing systems is a key factor in enhancing system performance. Data communication is typically mediated by communication buses and associated bus protocols. In its simplest form, the communication bus may take the form of a direct connection 30 between a master device 10 and a slave device 20 as shown schematically in FIG. 1A. However, more typically, as shown in FIG. 1B, the communication buses are implemented by an interconnect structure 70 used to couple a plurality of master devices 50, 60 with a plurality of slave devices 75, 80, 85. Each master device can issue access requests for handling by an addressed slave device. The handling of each access request involves an address transfer from a master device to a slave device, and one or more data transfers between that master device and the slave device. For a write access request these data transfers will pass from the master device to the slave device (in some implementations there will additionally be a write response transfer from the slave device to the master device), whilst for a read access request these data transfers will pass from the slave device to the master device.

The interconnect circuitry 70 will provide a plurality of connection paths for coupling the various master devices and slave devices. The way in which the various transfers are routed via those connection paths will be dependent on the bus protocol employed within the interconnect circuitry. One known type of bus protocol is the non-split transaction protocol, such as is employed within a data processing apparatus having an AHB bus designed in accordance with the AHB bus protocol developed by ARM Limited, Cambridge, United Kingdom.

As interconnect circuits increase in complexity, due to the need to support the interconnection of a large number of master and slave devices, then another type of bus protocol has been developed known as a split transaction protocol. In accordance with such a split transaction protocol, the plurality of connection paths within the interconnect circuit provide at least one address channel for carrying address transfers and at least one data channel for carrying data transfers. An example of such a split transaction protocol is the AXI (Advanced extensible Interface) protocol developed by ARM Limited, Cambridge, United Kingdom. The AXI protocol provides a number of channels over which information and data can be transferred, these channels comprising a read address channel for carrying address transfers for read access requests, a write address channel for carrying address transfers for write access requests, a write data channel for carrying data transfers for write access requests, a read data channel for carrying data transfers for read access requests, and a write response channel for returning transaction status information to the master device upon completion of a write access request. Use of such a split transaction protocol can increase the performance of a system compared with a similar system using a non-split transaction protocol.

It is known to issue access requests, whether write or read access requests, with identifier (ID) values associated therewith to identify the source of the access request. Any of the transfers taking place during processing of an access request are then also tagged with the associated ID value, to enable the various transfers involved in processing a particular access request to be tracked. Each master device may have a plurality of possible ID values that can be associated with access requests that it issues, thereby, for example, allowing transactions generated by different applications running on the same master to be distinguished from each other.

Irrespective of how the communication buses are constructed to allow communication between master and slave devices, one technique that is often adopted to seek to improve the performance of the data processing apparatus is to allow re-ordering of the transfers associated with various access requests, for example to seek to make more efficient use of the communication buses, to allow slave devices to operate more efficiently, etc. However, when allowing such re-ordering to take place, there is a potential for one or more hazard conditions to occur. For example, one hazard condition is a read after write (RAW) hazard condition which can occur when a master device wishes to issue a read access request to an address that is the subject of an already issued but still pending write access request. In such situations, the read access request should not be allowed to be processed until the write access request has completed since otherwise there is the possibility of the read occurring before the write.

Accordingly, it is known to provide hazard detection mechanisms within data processing systems to seek to detect the occurrence of possible hazard conditions, and to stall certain access requests when necessary to avoid those hazard conditions arising. For example, considering the earlier discussed AXI interconnect arrangement, master devices connected to an AXI interconnect are responsible for checking for RAW hazards for any write access requests that have been sent on the write address channel, and for which a write response has not yet been received. This requires the implementation of a mechanism for a master device to keep track of all pending write access requests.

However, the number of write access requests that may be pending at any one time will vary depending on how fast the master device can generate new write access requests, and also on how long any particular slave device takes to process write access requests and to send the write response. The latter is not easy to predict for a general purpose processor, as it may be connected to many different types of slave devices. Additionally, the amount of time that a slave device takes to return the write response may vary dynamically depending on, for example, how busy that slave device is. Therefore, determining how many write access requests the master device must be capable of hazard checking is difficult.

Previously, some master devices (for example the Cortex-R4 and Cortex-A9 processors developed by ARM Limited, Cambridge, United Kingdom) have implemented a fixed number of buffers for storing the addresses of at least certain types of write access requests that are pending. However, a problem that can arise is that if too few buffers are implemented then the performance of the master device can become restricted, since when all of the buffers of that master device are full, the master device must stall, and cannot send any further write access requests until space becomes available in one of the buffers. However, if enough buffers are implemented to cope with the worst case, then this has a high cost in terms of area and power due to the size and power consumption of the buffer circuitry.

An alternative approach, as for example is taken for non-cacheable write access requests in ARM's Cortex-A9 processor, is to use a counter to count the number of outstanding non-cacheable write access requests. This has the advantage that a large number of outstanding non-cacheable write access requests can be supported with very little area or power cost (due to the small size and low power consumption of the counter mechanism). However, since the counters cannot keep any record of the actual addresses involved in those pending write access requests, then when seeking to perform RAW hazard detection for any read access requests to be issued, it is not possible to do an address comparison with a pending write access request, and so it must pessimistically be assumed that the read address would match with the write address of a pending write access request, and accordingly the read access request must stall until all relevant outstanding write access requests complete.

Accordingly, it would be desirable to provide an improved technique for detecting one or more hazard conditions within such data processing systems.

SUMMARY OF THE INVENTION

Viewed from a first aspect, the present invention provides a data processing apparatus for coupling to one or more slave devices, the data processing apparatus comprising: processing circuitry for issuing a series of access requests for handling by said one or more slave devices, said series of access requests including one or more write access requests, each write access request specifying a write operation to be performed by an addressed slave device from said one or more slave devices, and each issued write access request being a pending write access request until the write operation has been completed by the addressed slave device; and hazard detection circuitry for detecting occurrence of at least one hazard condition in respect of the series of access requests issued by the processing circuitry; said hazard detection circuitry comprising: a pending write access history storage comprising at least one buffer and at least one counter for keeping a record of each pending write access request; update circuitry, responsive to receipt of a write access request to be issued by the processing circuitry, to perform an update process to identify that write access request as a pending write access request in one of said at least one buffers and, if the identity of another pending write access request is overwritten by that update process, to increment a count value in said at least one counter; on completion of each write access request by the addressed slave device, the update circuitry being arranged to perform a further update process to remove the record of that completed write access request from the pending write access history storage; and hazard checking circuitry, responsive to at least a subset of the access requests to be issued by the processing circuitry, to reference the pending write access history storage in order to determine whether said at least one hazard condition occurs.

In accordance with the present invention, hazard detection circuitry comprises a pending write access history storage comprising at least one buffer and at least one counter for keeping a record of each pending write access request. When a write access request is to be issued by the processing circuitry, an update process is performed to identify that write access request as a pending write access request in a buffer of the pending write access history storage. If as a result of that process, the identity of another pending write access request is overwritten in the buffer, then a count value in the at least one counter is incremented in order to ensure that a record of that other pending write access request is kept. On completion of each write access request, a further update process is performed to remove the record of that completed write access request from the pending write access history storage.

Through the use of this update process and further update process, the pending write access history storage can maintain a record of each pending write access request, even when the number of pending write access requests exceeds that that can be identified within the at least one buffer. This hence provides a reliable reference for hazard checking circuitry when seeking to determine whether that hazard condition occurs or not for certain access requests that the processing circuitry wishes to issue.

The mechanism of the present invention uses at least one buffer to hold detailed information for one or more outstanding write access requests, and uses one or more counters to allow further write access requests to be issued when the at least one buffer is full. This mechanism provides improved performance without the hardware cost and increased power consumption cost that would be associated with increasing the number of buffers. Further, through the presence of at least one buffer, it allows a more accurate determination of the occurrence of hazard conditions when compared with counter mechanisms, reducing the number of false stalls that would occur if only counters were used.

Whilst the hazard detection circuitry of the present invention may be operated with only a single buffer and a single counter, in one embodiment a plurality of buffers and a plurality of counters are provided within the pending write access history storage of the hazard detection circuitry. In yet further alternative embodiments, there may be one buffer and a plurality of counters, or a plurality of buffers and one counter.

The information that is stored within each buffer in order to identify a pending write access request can take a variety of forms. However, in one embodiment each write access request specifies a write address at which the write operation is to be performed by the addressed slave device, and the performance of said update process to identify a write access request as a pending write access request in one of said at least one buffers comprises storing at least the write address of that write access request in said one of said at least one buffers.

In one embodiment, each counter in the pending write access history storage is associated with a group of access requests and is arranged to maintain a count value indicative of the number of pending write access requests in said group which are not identified in said at least one buffer; and the update circuitry is arranged when performing said update process: (i) to identify a free buffer from said at least one buffer and to store within said free buffer information identifying said write access request to be issued by the processing circuitry; and (ii) if all of said at least one buffers store information identifying a pending write access request at the time a free buffer is to be identified, to select one of said at least one buffers to be said free buffer, to identify the group of access requests to which the current information stored in that selected free buffer belongs, and to increment the count value of the counter associated with that identified group.

If only a single counter is provided, then the group of access requests associated with that counter will be all access requests. However, when multiple counters are provided, each counter can be associated with a different grouping of access requests. The access requests can be grouped in a variety of ways. However, in one embodiment the access requests may be grouped with reference to the addresses being accessed, so that access requests directed to a particular address range are associated with a particular group. In an alternative embodiment, each access request issued by the processing circuitry has an ID value associated therewith, and each group of access requests comprises those access requests having a particular ID value, such that the plurality of counters comprise a counter for each ID value.

In such embodiments, the information identifying a write access request as stored in each buffer comprises an indication of the ID value of that write access request. This enables the relevant buffer to be invalidated when a particular write access request is completed, and also enables the relevant counter to be incremented when the content of a buffer is evicted to make way for information relating to a new write access request to be issued.

In one embodiment, the information identifying a write access request as stored in each buffer further comprises an indication of a write address specified by said write access request and a valid field, the valid field being set when the information identifying said write access request is stored in the buffer during said update process, and being cleared to invalidate the buffer during said further update process performed on completion of said write access request.

The above described update process enables the pending write access history storage to keep a record of all pending write access requests, provided the number of pending write access requests does not exceed that capable of being recorded within the at least one buffer and the at least one counter. In one embodiment, if when performing the update process it is determined necessary to overwrite the current contents of one of the buffers, and it is determined that the count value of the counter associated with the group of access requests to which the pending write access request whose information is to be overwritten belongs is such as to prevent the incrementing of that count value, then the processing circuitry is arranged to be stalled from issuing the new write access request. The processing circuitry may then decide to retry that new write access request after a certain delay, or may alternatively choose to try another access request and return to that write access request at a later point. In an alternative embodiment, the processing circuitry may merely continue to assert the write access request, with the hazard detection circuitry retrying the update process after a certain delay.

Typically it will be identified that the counter value is such as to prevent the incrementing of that count value if it is currently at a maximum value. However, as will be discussed in more detail later, in some embodiments the buffers are also used to store write access requests issued in connection with evictions of data from storage structures such as caches. In such embodiments it may be decided that the count value cannot be incremented even if it is not currently at its maximum value. For example, if the current count value plus any increments that will be necessary due to eviction processes that are in progress equals the maximum count value, then it may be decided that the current write access request from the processing circuitry should be stalled. This avoids an eviction process being performed (which may take several cycles) only to find that there is then no space available for the write access request triggered by that eviction process to be stored within the buffers.

The further update process performed by the update circuitry on completion of each write access request can be performed in a variety of ways. However, in one embodiment, the update circuitry is arranged when performing said further update process: (i) to identify the group of access requests to which the completed write access request belongs and to decrement the count value of the counter associated with that group if that count value is non-zero; or (ii) if the count value of the associated counter is zero, to invalidate the buffer storing the information identifying that completed write access request. If multiple buffers are provided, and multiple of those buffers store write access information for a particular group of access requests (for example for a number of access requests with the same ID value), then the oldest pending write access request from that group is invalidated in the buffer. There are a number of ways in which the update circuitry can maintain knowledge of the age of the buffer entries. For example, the buffers may be arranged in a FIFO format thereby enabling a ready determination of the oldest pending write access request for any particular ID value.

Various types of hazard condition may be detected by the hazard checking circuitry. In one embodiment, the hazard checking circuitry is responsive to a read access request to be issued by the processing circuitry, to reference the pending write access history storage in order to determine whether issuance of the read access request would cause a read after write (RAW) hazard condition to occur. The actions taken upon detection of a hazard condition may vary dependent on implementation, but in one embodiment the hazard checking circuitry is arranged to cause the processing circuitry to stall issuance of the read access request if said RAW hazard condition is determined to occur.

In one embodiment, the hazard checking circuitry is arranged to determine occurrence of the RAW hazard if either of the following conditions is determined: (a) a read address specified by the read access request matches a write address of a pending write access request identified in the at least one write access buffer; (b) the count value in said at least one counter indicates the presence of a pending write access request that is capable of specifying a write address matching said read address.

As an alternative to, or in addition to, seeking to detect RAW hazards, the hazard checking circuitry may also seek to detect other hazards, for example write after write (WAW) hazards. In particular, in one embodiment, the hazard checking circuitry is responsive to a write access request to be issued by the processing circuitry, to reference the pending write access history storage in order to determine whether issuance of the write access request would cause a WAW hazard condition to occur, the update circuitry being arranged to perform the update process in respect of that write access request only if said WAW hazard is determined not to occur by the hazard checking circuitry. As with occurrence of RAW hazards, the processing circuitry may be arranged to stall issuance of a write access request if a WAW hazard condition is determined to occur.

In one embodiment, the hazard checking circuitry is arranged to determine occurrence of the WAW hazard if either of the following conditions is determined: (a) a write address specified by the write access request matches a write address of a pending write access request identified in the at least one write access buffer; (b) the count value in said at least one counter indicates the presence of a pending write access request that is capable of specifying a write address matching the write address specified by the write access request.

In embodiments where each access request issued by the processing circuitry has an ID value associated therewith, then the detection of occurrence of a WAW hazard can be modified. In particular, at said steps (a) and (b) the hazard checking circuitry determines that the WAW hazard does not occur if the pending write access request giving rise to the match has the same ID value as the write access request to be issued by the processing circuitry. Instead, the system ensures that write access requests having the same ID value are not reordered, thereby avoiding the possibility of a WAW hazard occurring.

In some embodiments, it may be possible to allocate the ID value, or to modify the allocated ID value, so that the write access request to be issued by the processing circuitry then has the same ID value as the pending write access request giving rise to the match, thereby avoiding the WAW hazard.

In one embodiment, the processing circuitry has a storage structure associated therewith, and the processing circuitry is arranged to perform an eviction process with respect to the storage structure as a result of which evicted content of the storage structure may need to be written to one of the slave devices. A typical example of such a storage structure would be a cache such as a level one cache associated with a processor core. A problem that can occur with such an eviction process is that at the time the eviction process is started, it is not known whether the cache line to be evicted will be valid and dirty or not, nor is the address of the line to be evicted known. To find this information out, the tag and/or dirty RAM entries must be read, which may take several cycles. If the cache line is dirty, then the address that was read from the tag RAM must be stored somewhere until it can be issued as a write access request to cause the dirty cache line's data to be stored in a lower level of the cache hierarchy or in main memory, and until it can be added to the hazard buffers. This means that at the time the RAM read process starts at the beginning of the eviction process, it is not known whether there needs to be storage available to hold the address or not. When the RAM read process completes, it is then known if there needs to be storage, but if there is no free storage available on that cycle then the address would have to be discarded and the RAM read process initiated again (consuming extra power and impacting performance) when there is storage available. Previous processors have typically sought to address this problem by providing a dedicated eviction address buffer to hold the eviction address, thus guaranteeing that there will be storage available when needed as nothing else is allowed to use that dedicated eviction address buffer.

However, in accordance with embodiments of the present invention, this same functionality can be achieved without the requirement for a dedicated eviction address buffer, thereby saving area. In particular, in one embodiment, the processing circuitry is arranged to issue a write access request for the evicted content to cause a record of that write access request to be maintained by the pending write access history storage of the hazard detection circuitry. In one particular embodiment, prior to performing the eviction process the pending write access history storage is referenced to ensure there is space to accommodate a record of the write access request to be issued for the evicted content. By ensuring that there is space available in the pending write access history storage before performing the eviction, it can then be ensured that there will be space to store any write access request needed to be issued as part of the eviction process without the need to provide a separate dedicated eviction address buffer.

Viewed from a second aspect, the present invention provides a method of detecting occurrence of at least one hazard condition in respect of a series of access requests issued by processing circuitry for handling by one or more slave devices, said series of access requests including one or more write access requests, each write access request specifying a write operation to be performed by an addressed slave device from said one or more slave devices, and each issued write access request being a pending write access request until the write operation has been completed by the addressed slave device, the method comprising the steps of: providing a pending write access history storage comprising at least one buffer and at least one counter for keeping a record of each pending write access request; responsive to receipt of a write access request to be issued by the processing circuitry, performing an update process to identify that write access request as a pending write access request in one of said at least one buffers and, if the identity of another pending write access request is overwritten by that update process, to increment a count value in said at least one counter; on completion of each write access request by the addressed slave device, performing a further update process to remove the record of that completed write access request from the pending write access history storage; and responsive to at least a subset of the access requests to be issued by the processing circuitry, referencing the pending write access history storage in order to determine whether said at least one hazard condition occurs.

Viewed from a third aspect, the present invention provides a data processing apparatus for coupling to one or more slave device means, the data processing apparatus comprising: processing means for issuing a series of access requests for handling by said one or more slave device means, said series of access requests including one or more write access requests, each write access request specifying a write operation to be performed by an addressed slave device means from said one or more slave device means, and each issued write access request being a pending write access request until the write operation has been completed by the addressed slave device means; and hazard detection means for detecting occurrence of at least one hazard condition in respect of the series of access requests issued by the processing means; said hazard detection means comprising: a pending write access history storage means comprising at least one buffer means and at least one counter means for keeping a record of each pending write access request; update means, responsive to receipt of a write access request to be issued by the processing means, for performing an update process to identify that write access request as a pending write access request in one of said at least one buffer means and, if the identity of another pending write access request is overwritten by that update process, for incrementing a count value in said at least one counter means; on completion of each write access request by the addressed slave device means, the update means for performing a further update process to remove the record of that completed write access request from the pending write access history storage means; and hazard checking means, responsive to at least a subset of the access requests to be issued by the processing means, for referencing the pending write access history storage means in order to determine whether said at least one hazard condition occurs.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1A:
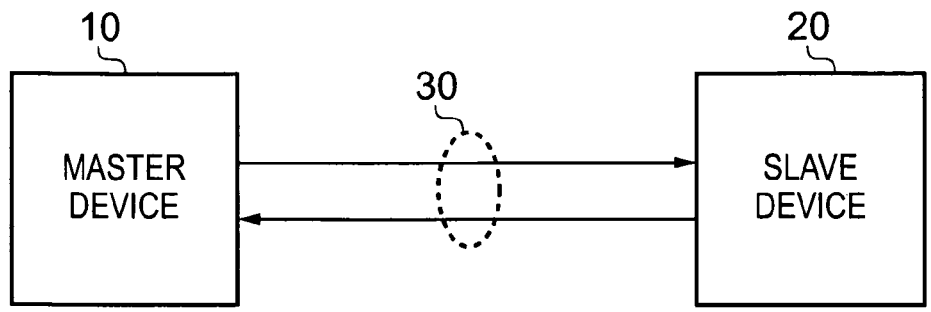
FIGS. 1A and 1B illustrate known techniques for coupling master and slave devices to enable access requests to be issued by the master devices for handling by the slave devices.
Figure 1B:
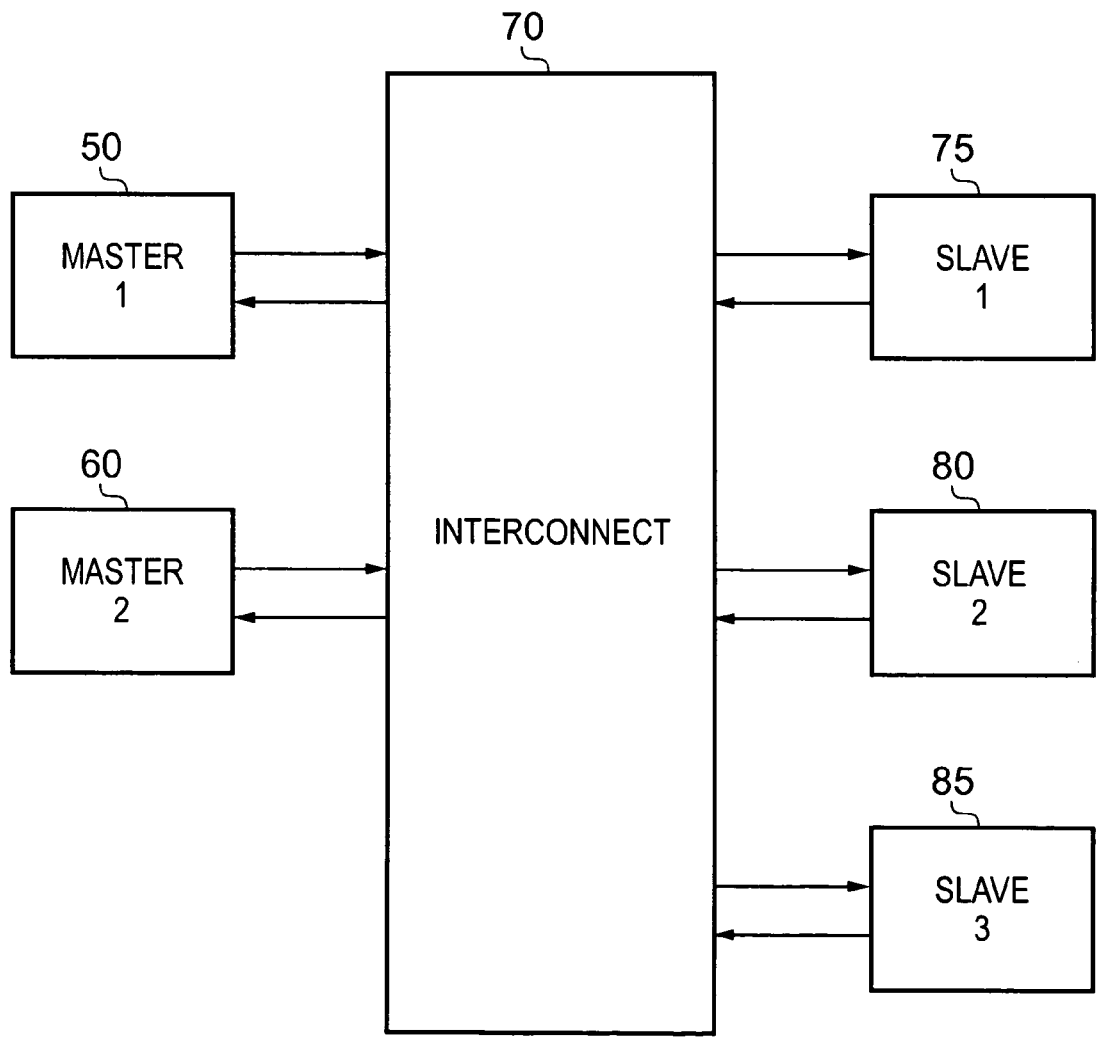
Figure 2:
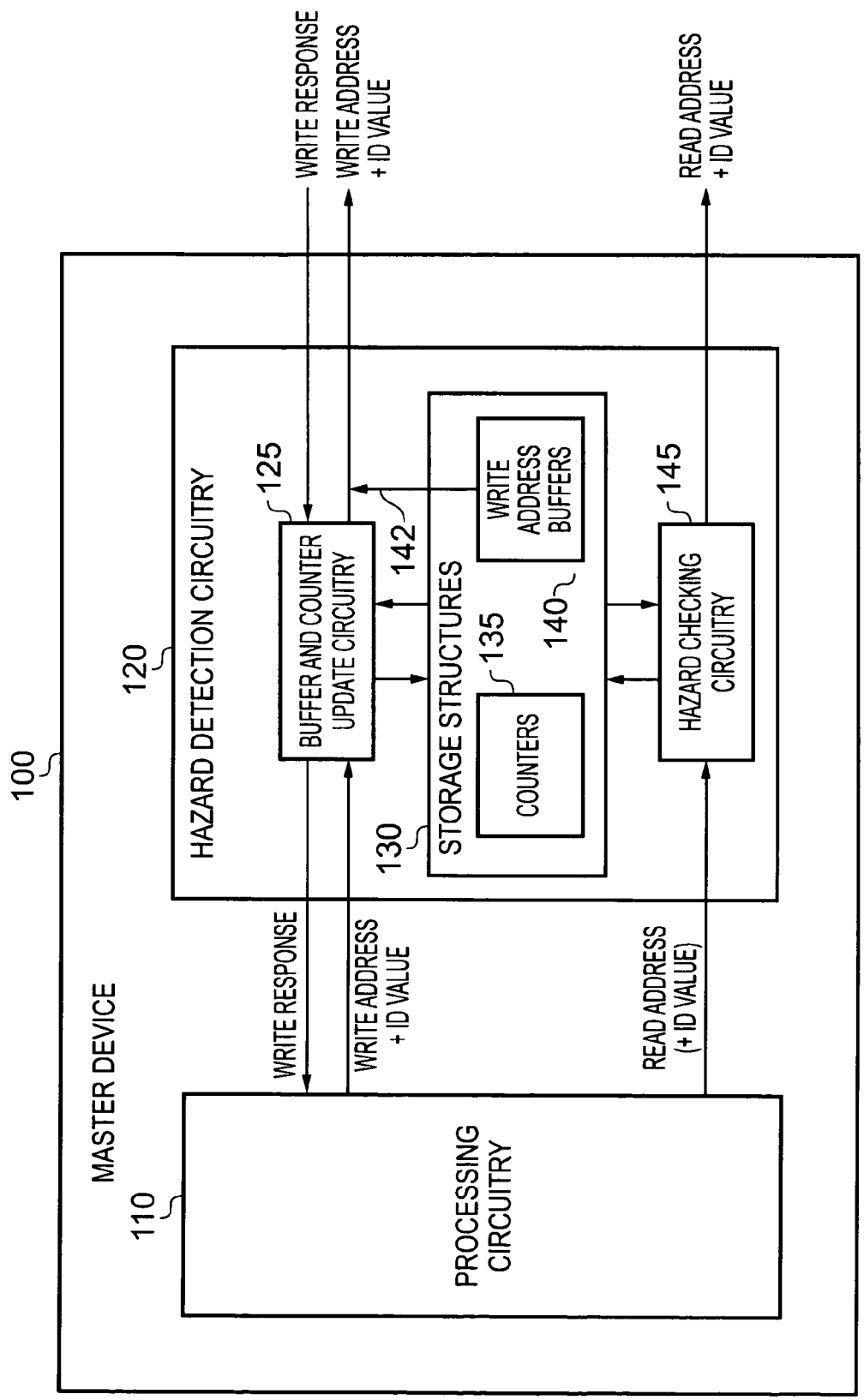
FIG. 2 is a block diagram illustrating components provided within a master device in accordance with one embodiment of the present invention.

FIG. 2 is a block diagram illustrating the components provided within a master device 100 in accordance with one embodiment of the present invention. The master device will be coupled to one more slave devices using a known technique, and accordingly may be coupled via a direct connection as discussed earlier with reference to FIG. 1A, or via an interconnect structure such as discussed earlier with reference to FIG. 1B. The master device 100 includes processing circuitry 110 which may issue a series of access requests, including both write access requests and read access requests, for handling by various slave devices. Typically the slave device to which any particular access request is directed is determined from an address specified in the access request. For a write access request, that address takes the form of a write address specifying a location at which a write operation is to be performed by the slave device, and similarly for a read access request, the address will take the form of a read address identifying a location from which data is to be read by the slave device.

The processing circuitry 110 can take a variety of forms, but in one embodiment the master device 100 is a processor and the processing circuitry 110 takes the form of a processor core. In one embodiment, the master device may be a multi-core processor, in which event the multiple cores may collectively be viewed as the processing circuitry 110 coupled to hazard detection circuitry 120 used for all of the cores, or alternatively each core may be viewed as a separate processing circuit 110, each core having its own associated hazard detection circuitry 120.

Further, it will be appreciated that the master device 100 need not be a processor, but instead could be any master device capable of issuing access requests for handling by one or more slave devices.

When the processing circuitry 110 wishes to issue an access request to a slave device, the address to which that access request relates is first passed to hazard detection circuitry 120 which is used to detect the occurrence of one or more hazard conditions. In particular, each time a write access request is to be issued, the write address that is to be specified in that write access request (along with the ID value to be used for that write transaction) is passed to the buffer and counter update circuitry 125 which then performs an update process with respect to the storage structures 130 maintained by the hazard detection circuitry 120. The storage structures 130 include at least one write address buffer 140 and at least one counter 135, and for the purposes of the following description it will be assumed that the storage structures 130 comprise a plurality of write address buffers 140 and a plurality of counters 135. The format of the write address buffers and counters in accordance with one embodiment of the present invention are illustrated in FIGS. 3A and 3B.

Figures 3A, 3B:
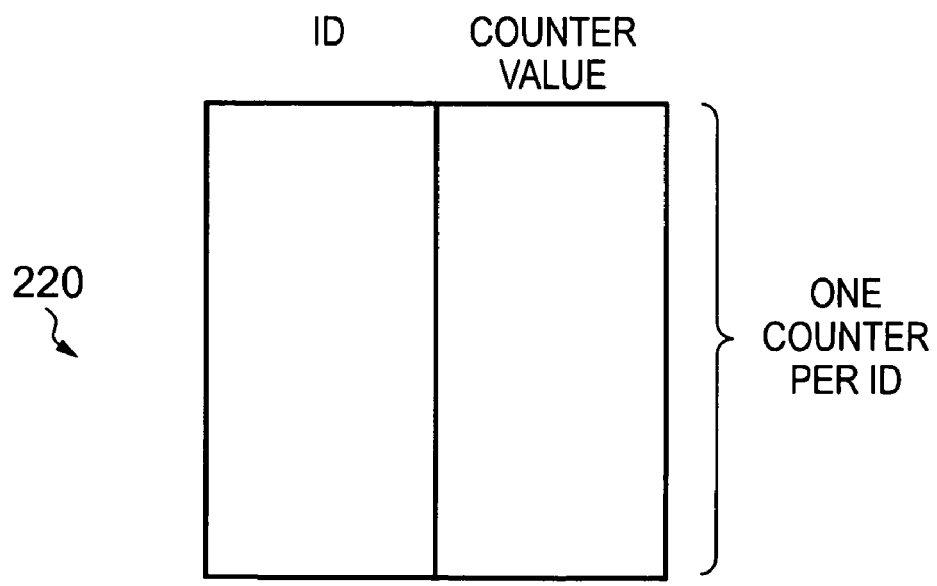
FIG. 3A illustrates the write address buffers of FIG. 2 in accordance with one embodiment of the present invention.
FIG. 3B illustrates the counters of FIG. 2 in accordance with one embodiment of the present invention.

As shown in FIG. 3A, a number of write address buffers 200 are provided, in the example as illustrated in FIG. 3A there being four write address buffers. Each write address buffer is used to store a record of a pending write access request, and in particular stores an ID value 205 identifying the source of the write access request, and the write address 210 specified by that write access request. In one embodiment, a valid bit 215 is also provided, which is set when a new pending write access request is added to the write address buffer by the buffer and counter update circuitry 125, and which is cleared on completion of that pending write access request to identify that the contents of that buffer are now invalidated, and that hence that buffer is available as a free buffer for storing the details of a new pending write access request.

As regards the counters, as illustrated in FIG. 3B, in one embodiment a separate counter is provided for each ID value. As mentioned earlier, multiple ID values may be available to a particular processing circuit 110, for example to allow access requests generated by different applications running on the same processing circuit to be distinguished, thereby allowing access request sequences from each application to be independently ordered in situations where the processes themselves are independent of each other.

The number of write address buffers 200 and the size of the counters 220 may be varied dependent on the performance and PPA (Power, Performance (frequency) and Area) requirements of the product.

As mentioned earlier, when the processing circuitry 110 wishes to issue a write access request, the write address of that write access request is passed to the buffer and counter update circuitry 125, and this causes the buffer and counter update circuitry to perform an update process. The update process causes that write access request to be identified as a pending write access request in one of the buffers 140. If at least one of the buffers is marked as invalid, then all that is required is to write the ID value and write address in that buffer and to set the valid bit. However, if all of the write address buffers are marked as valid at the time the update process is performed, the update circuitry 125 needs to select one of those buffers for storing the details of the new write access request. A number of schemes can be used to determine the buffer to be selected, but in one embodiment the buffer holding the oldest pending write access request is selected. Given that the current content of the selected buffer will then be overwritten during the update process, the update circuitry first notes the ID value currently held in that selected buffer, and increments the count value of the counter 135 for that ID value. The current contents are then overwritten with the details of the new write access request.

At the same time, the write access request may be propagated from the update circuitry 125 on to the slave device (via any intervening interconnect circuit). Alternatively, if it is determined that the write access request cannot be propagated to a slave device at that time, it is later propagated on to the slave device by retrieving the required information from the write address buffer 140 via path 142.

Whilst not explicitly shown in FIG. 2, it will be appreciated that to process a write access request, write data also needs to be provided from the processing circuit to the slave device. When in due course the slave device has written the write data to the write address specified by the write access request, it will issue a write response back to the master device 100, and this write response will be received by the buffer and counter update circuitry 125, causing it to perform a further update process. Whilst this further update process is performed, the write response will also be propagated back to the processing circuitry 110. The further update process performed on receipt of the write response signal removes the record of the completed write access request from the pending write access history storage formed by the storage structures 130. In particular, the write response signal will include the ID value specified by the original write access request, and the further update process will cause the count value held in the counter for that ID value to be decremented. However, if the count value is already zero, then the further update process will instead cause the write address buffers to be referenced in order to invalidate the buffer storing details of the pending write access request with that ID value. If the buffers store details of more than one write access request having that ID value, then the oldest pending write access request with that ID value is invalidated.

By the above described techniques, the pending write access history storage 130 maintains a record of each pending write access request, and the hazard checking circuitry 145 can then reference the pending write access history storage when seeking to detect the occurrence of certain hazard conditions. In one embodiment, the hazard checking circuitry 145 is used to detect the occurrence of RAW hazards, and accordingly when the processing circuitry 110 wishes to issue a read access request, the read address to be specified by that read access request, along with the ID value, is provided to the hazard checking circuitry 145. More details as to how the hazard checking circuitry 145 detects the presence of an RAW hazard will be described later with reference to the flow diagram of FIG. 6. If a RAW hazard is detected, then in one embodiment a stall signal is returned to the processing circuitry 110 to identify that the read access request cannot be issued at the current time. The processing circuitry 110 may then decide to retry the read access request at a later time, and may determine whether any other access requests can be issued in the interim. If no RAW hazard is detected, then the read access request can be propagated on to the slave device from the hazard checking circuitry 145.

Whilst in FIG. 2 it is assumed that the hazard checking circuitry 145 is seeking to detect RAW hazards, it is also possible to use the hazard checking circuitry to seek to detect the occurrence of other hazards. For example, the hazard checking circuitry 145 may be used to seek to detect the occurrence of a WAW hazard. In this event, when the processing circuitry 110 wishes to issue a write access request, the write address and ID value are first provided to the hazard checking circuitry 145. More details as to how the hazard checking circuitry 145 determines whether a WAW hazard would occur will be described later with reference to the flow diagram of FIG. 7. If a WAW hazard is detected, then a stall signal is returned to the processing circuitry 110. However, if no WAW hazard is detected, then the write address and ID value are then passed to the buffer and counter update circuitry 125 to cause the update process discussed earlier to be performed.

Figure 4:
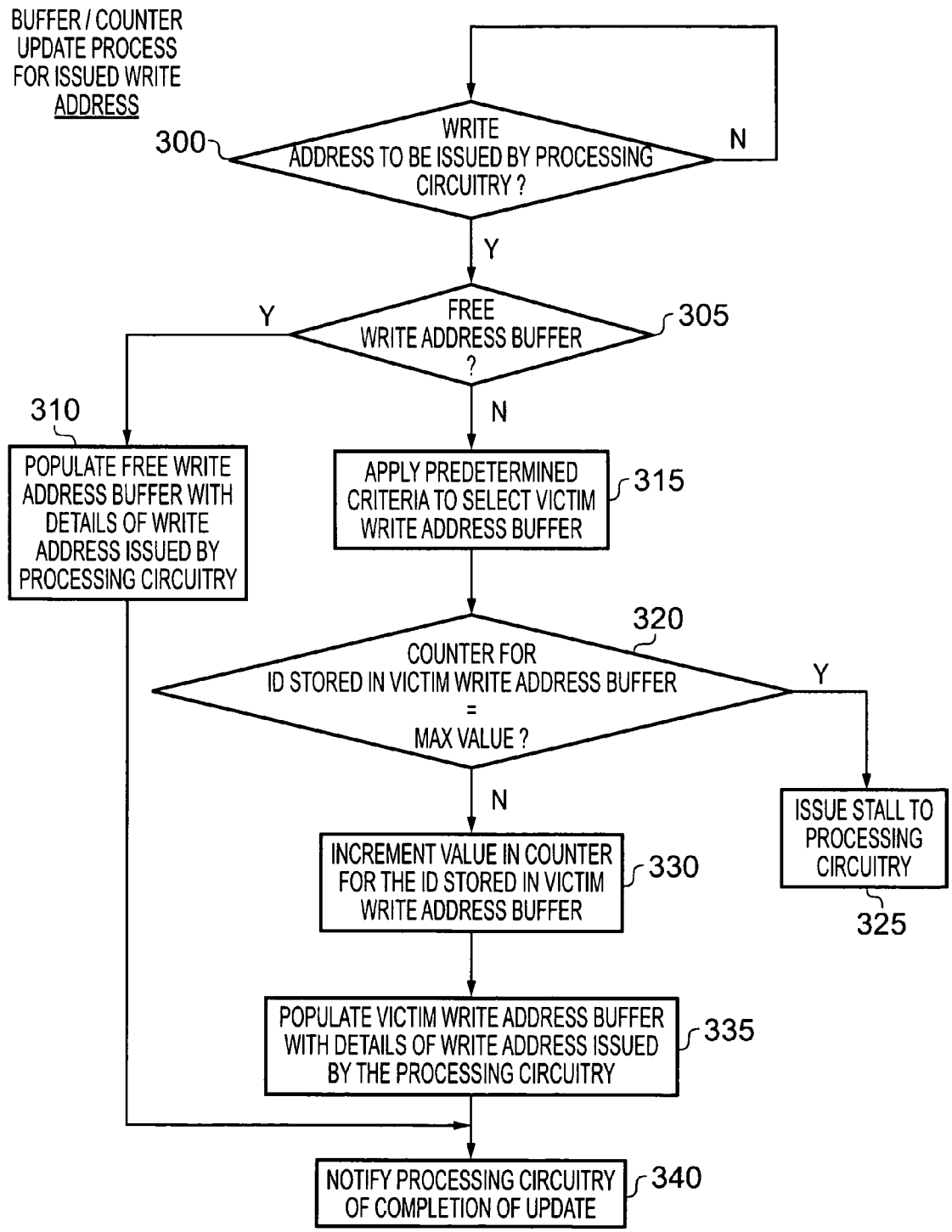
FIG. 4 is a flow diagram illustrating an update process performed by the buffer and counter update circuitry of FIG. 2 in accordance with one embodiment of the present invention.

FIG. 4 is a flow diagram illustrating the update process performed by the buffer and counter update circuitry 125 in accordance with one embodiment of the present invention. At step 300, the buffer and counter update circuitry 125 awaits an indication that a write access request is to be issued by the processing circuitry. If it is, then at step 305 the update circuitry 125 determines whether there is a free write address buffer available. In accordance with the embodiment of the write address buffers as shown in FIG. 3A, this will be indicated by the valid field 215, and in particular if there is a buffer whose valid bit is clear, this indicates that that buffer is a free write address buffer. If a free write address buffer is identified at step 305, then the process proceeds to step 310, where the free write address buffer is populated with details of the write access request to be issued by the processing circuitry. In particular, the ID value and write address are stored within the free write address buffer, and the valid field is set. Thereafter, the process proceeds to step 340, where the processing circuitry is notified of completion of the update process.

However, if no free write address buffer is identified at step 305, then predetermined criteria are applied at step 315 to select a victim write address buffer. In one embodiment, the write address buffer storing details of the oldest pending write access request is selected as the victim write address buffer. However, there is no requirement to select the buffer storing the oldest pending write access request. Instead, the update circuitry 125 could arbitrarily select between multiple write address buffers storing write access requests for different ID values. However, it should be noted that if multiple buffers store pending write access requests having the same ID value, then only the oldest of those pending access requests with the same ID value can be chosen. Hence, purely by way of example, if there are four write access buffers, two of which store pending write access requests for ID value A, one of which stores a pending write access request for ID value B, and one of which stores a pending write access request for ID value C, then the process performed at step 315 could select arbitrarily between the contents of three of the write access buffers (excluding from the selection the buffer storing the most recent pending write access request for ID value A).

Whatever predetermined criteria is applied at step 315, once the victim write address buffer has been selected, the ID value currently stored in that victim write address buffer is determined, and then it is determined at step 320 whether the counter for that ID value is at its maximum value. If it is, then it would not be possible for the pending write access history storage to keep a record of the pending write access currently held in the victim write address buffer if that information were to be overwritten by the details of the new write access request, and accordingly the process proceeds to step 325 where a stall signal is issued to the processing circuitry.

In embodiments where the predetermined criteria applied at step 315 provides some choice as to the victim write address buffer selected, then it will be appreciated that as an alternative to proceeding directly to step 325, the process could instead return from step 320 to cause a different victim write address buffer to be selected at step 315, and only if all possible victim write address buffers have been considered, and the counters for all of the relevant ID values are at the maximum value, will a stall signal then be issued to the processing circuitry at step 325.

As will be discussed in more detail later, in one embodiment of the present invention, the write address buffers 140 can also be used to store details of write access requests issued as a result of an eviction process performed by the processing circuitry in relation an associated storage structure such as a cache. Since the eviction process can take multiple cycles, a free location in the write address buffers can effectively be reserved for the eviction process by modifying the determination at step 320. In particular, at step 320, it can in those embodiments be determined whether the current value of the counter for the ID value stored in the victim write address buffer plus any increments that will be required for eviction operations in progress, equals the maximum value of the counter, and if that condition is true then the process will proceed to step 325. Otherwise, the process will proceed to step 330.

Assuming the condition evaluated at step 320 is determined not to be true, then the process proceeds to step 330 where the count value in the counter for the ID value stored in the victim write address buffer is incremented. At this point, a record of the pending write access request identified by the current contents of the victim write address buffer has now been incorporated within the counter, and accordingly those current contents can now be overwritten. Accordingly, the process proceeds to step 335, where the victim write address buffer is populated with the details of the write access request to be issued by the processing circuitry, this involving writing the ID value and the write address in that write address buffer and setting the valid bit. Thereafter, the process proceeds to step 340 where the processing circuitry is notified of completion of the update process.

As an alternative to issuing a stall signal to the processing circuitry at step 325, the update circuitry 125 may merely wait for some predetermined length of time and then return to step 305, with the processing circuitry 110 keeping the write address and ID value asserted until it receives the notification at step 340.

Figure 5:
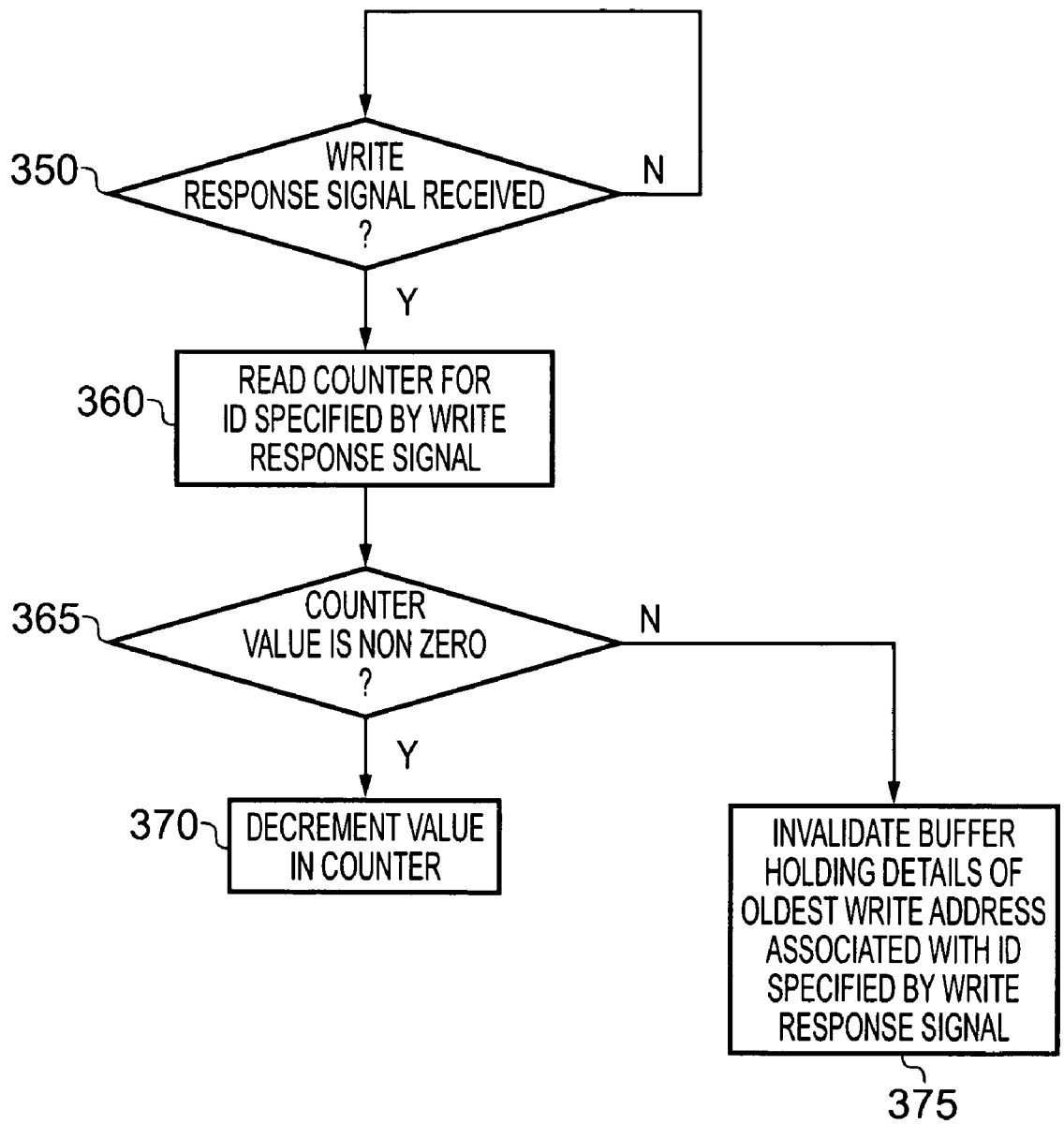
FIG. 5 illustrates a further update process performed by the buffer and counter update circuitry in accordance with one embodiment of the present invention.

FIG. 5 is a flow diagram illustrating the further update process performed by the update circuitry 125 upon receipt of a write response signal from the slave device that has processed a write access request. In particular, at step 350, the update circuitry 125 awaits receipt of such a write response signal. Upon receipt of such a write response signal, the update circuitry 125 determines the ID value included with that write response signal, and then reads the counter for that ID value at step 360. At step 365 it is determined whether that counter value is non-zero, and if it is the counter value is then decremented by one at step 370, thereby removing the record of that pending write access request from the pending write access history storage.

However, if it is determined at step 365 that the counter value is zero, then instead the process branches to step 375 where the buffer holding details of the oldest write address associated with the ID value specified by the write response signal is invalidated. By performance of either step 370 or step 375, it will be appreciated that the record of the write access request now indicated as having been completed by the write response signal is removed from the pending write access history storage.

Figure 6:
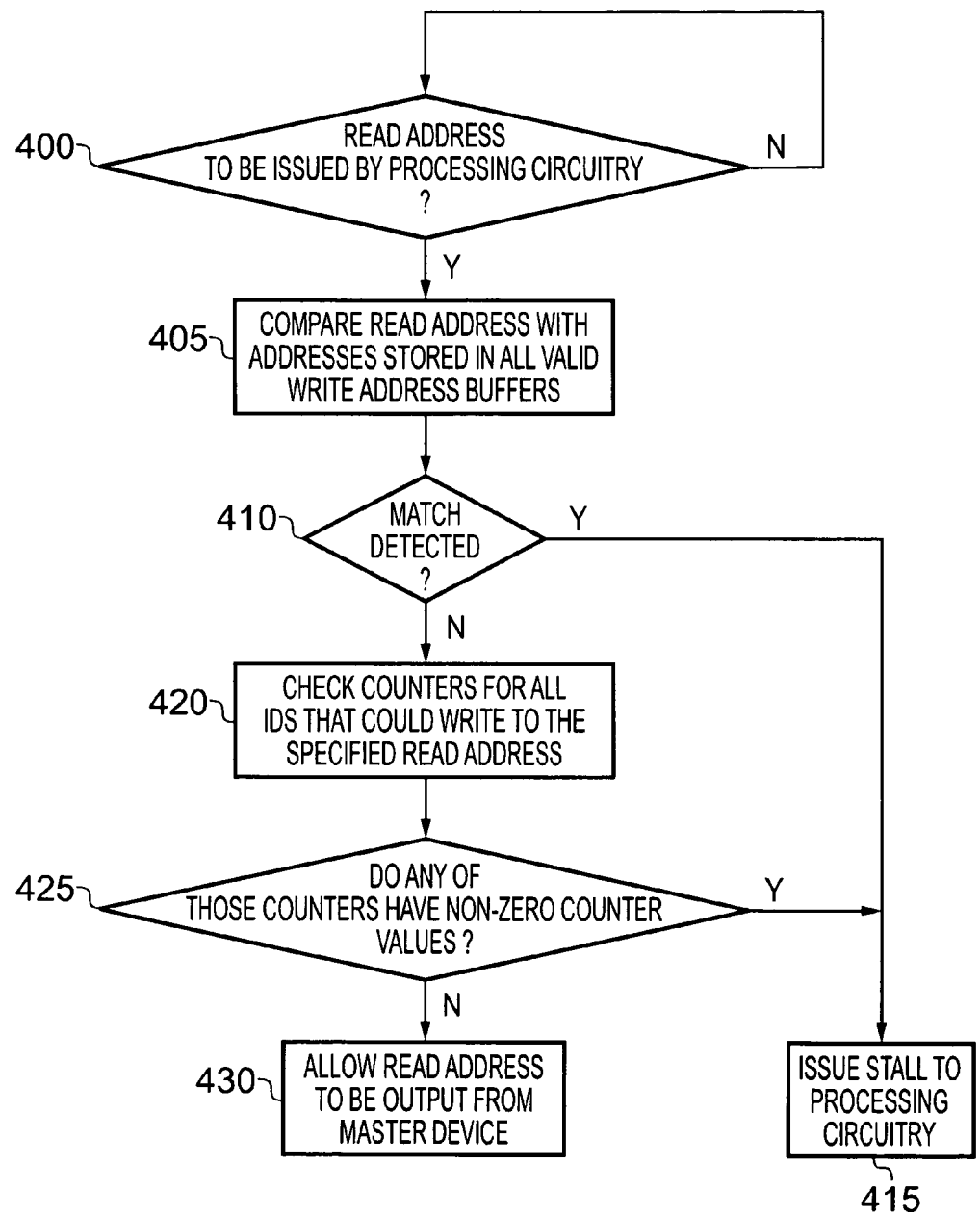
FIG. 6 is a flow diagram illustrating a hazard checking operation performed by the hazard checking circuitry of FIG. 2 in accordance with one embodiment of the present invention.

FIG. 6 is a flow diagram illustrating the hazard checking process performed by the hazard checking circuitry 145 in accordance with one embodiment when seeking to detect occurrence of a RAW hazard. At step 400, the hazard checking circuitry 145 awaits an indication that a read access request is to be issued by the processing circuitry. Upon receipt of such an indication, the hazard checking circuitry 145 compares the read address of that read access request with the addresses stored in all valid write address buffers. In principle, it may be the case that not all valid write address buffers needs to be checked. For example, access requests having certain ID values may not be able to write to the address specified by the read address, and hence in principle it may be possible to exclude certain of the valid write address buffers from the comparison process of step 405. However, in general it is expected that the number of write address buffers will be relatively small, and in such cases the additional logic required to determine whether any write address buffers can be excluded from the comparison would typically not be warranted.

Following step 405, it is then determined at step 410 whether any match was detected by the comparison process, i.e. whether the read address is the same as the write address stored in any valid write address buffer. If it is, then the process branches to step 415 where a stall signal is issued to the processing circuitry. However, if no match is detected, then it is necessary to refer to the counters in order to determine whether there is still a possibility of a RAW hazard occurring. In particular, at step 420, the counters for all ID values that could write to the specified read address are checked. This may in fact involve checking all of the counters, but as mentioned earlier in some embodiments access requests with particular ID values may not be able to write to the specified read address, and accordingly the counters for those ID values would not need to be checked.

At step 425, it is determined whether any of those counters have non-zero counter values. Provided they do not, then no RAW hazard can occur, and accordingly the read address is allowed to be output from the master device at step 430, i.e. the read access request is allowed to proceed. However, if any of those counters have non-zero counter values, then it has to be assumed that there is a pending write access request that may write to the specified read address, and accordingly the process proceeds to step 415 where a stall signal is issued to the processing circuitry.

Instead of issuing a stall signal at step 415, in an alternative embodiment the hazard checking circuitry 145 may merely implement a delay and return to step 405, and the processing circuitry 110 in that embodiment will merely continue to assert the read access request until it is determined at step 430 that the read access request can proceed, and accordingly the read address and ID value are propagated on to the slave device.

As mentioned earlier, the hazard checking circuitry 145 need not be restricted to only seeking to detect RAW hazards. Alternatively, or in addition, the hazard checking circuitry 145 may be used to detect other forms of hazard, for example a WAW hazard.

Figure 7:
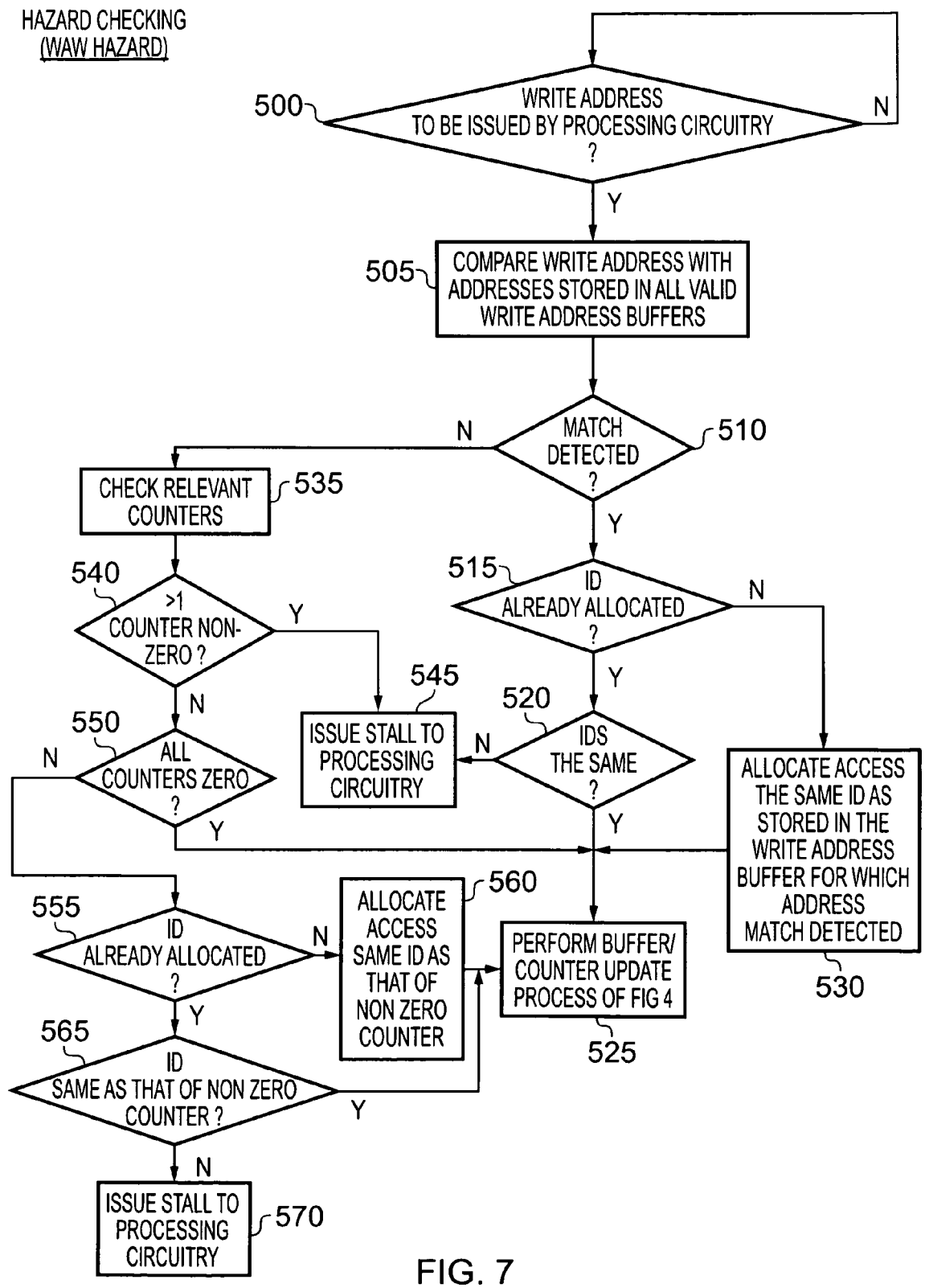
FIG. 7 illustrates another hazard checking process that may be performed by the hazard checking circuitry in accordance with one embodiment of the present invention.

FIG. 7 is a flow diagram illustrating the process performed in order to detect the occurrence of a WAW hazard.

At step 500, the hazard checking circuitry 145 awaits an indication that a write access request is to be issued by the processing circuitry. Upon receipt of such an indication, the write address to be specified by the write access request is compared with the addresses stored in all valid write address buffers at step 505. It is then determined at step 510 whether a match has been detected, and if so the process proceeds to step 515. At step 515, it is determined whether an ID value has already been allocated to the write access request that the processing circuitry wishes to issue. In one embodiment, the processing circuitry may be arranged to always allocate an ID value prior to providing the write address to the hazard checking circuitry 145, in which event step 515 is redundant, and the process will proceed directly from step 510 to step 520. However, in the more general case, the processing circuitry may delay allocating the ID until after the initial steps of the hazard checking process have been performed. In particular, if at step 515 it is determined that the ID value has not already been allocated, then the process proceeds to step 530, where the access is allocated the same ID value as is stored in the write address buffer for which the address match was detected. The reason for doing this is that, when employing certain bus protocols, for example the earlier mentioned AXI protocol, the WAW hazard is avoided if the later write access request to the same address has the same ID value as the earlier write access request, since by giving both write access requests the same ID value, bus protocols such as AXI then ensure that they cannot be completed out of order. Following step 530, the process then proceeds to step 525, where the buffer/counter update process of FIG. 4 is then performed, whereafter the write access request can be issued to the slave device.

If instead the process proceeds from step 515 to step 520, it is determined whether the ID values are the same. If they are, then the process can proceed to step 525, but if the ID values are not the same, then the process proceeds to step 545 where a stall signal is issued to the processing circuitry.

If no match is detected at step 510, then the process proceeds to step 535 where the relevant counters are checked. This may involve checking the count values of all counters. However, it may be possible to restrict this checking operation to a subset of the counters if the write address can only be written to by a subset of the ID values. Once the count values of the relevant counters have been checked, it is determined at step 540 whether more than one of those counters had a non-zero count value. If this is true, then it is possible that a previous pending write access request with a different ID value may be writing to the same write address, and accordingly a WAW hazard has been detected. Accordingly, the process proceeds to step 545 where a stall signal is issued to the processing circuitry.

If at step 540 it is determined that there is not more than one counter with a non-zero count value, then the process proceeds to step 550, where it is determined whether all of the counter values are zero. If all of the counter values are zero, then it is apparent that there is no preceding pending write access request which could write to the write address of the new write access request, and accordingly the process proceeds to step 525 where the buffer/counter update process of FIG. 4 is performed. If at step 550 it is determined that not all of the counters are zero, then by the combination of steps 540 and 550 it has been determined that one of the counter values is non-zero. At step 555 it is determined whether the ID value for the new write access request has already been allocated, and if so it is determined at step 565 whether that ID value is the same as that of the non-zero counter. If it is, then the process proceeds to step 525, whereas otherwise the process proceeds to step 570 to cause a stall signal to be issued to the processing circuitry (since if the ID values are not the same, then a WAW hazard has been detected).

If at step 555 it is determined that the ID value has not already been allocated, then at step 560 the new access request is allocated the same ID value as that of the non-zero counter, whereafter the process proceeds to step 525.

From the above description, it will be appreciated that embodiments of the present invention provide a hazard checking mechanism that gives the performance benefits of being able to support the presence of a large number of outstanding write access requests, without the hardware cost of increasing the number of buffers, whilst also keeping the amount of pessimistic hazard detection to a reduced level. The technique of embodiments of the present invention hence reduces the number of buffers and hazard comparators needed for a given performance level, hence saving power.

As also discussed, further enhancements can be made if the ID value used by reads and writes are based on some function of the address, for example if the ID value is determined from the memory type, and it is known that a particular address will always have the same memory type. In this case, when performing a check for non-zero counters, it is necessary to only check the counters for ID values that could potentially write to the address being checked, potentially this requiring only a single counter to be checked.

Figure 8:
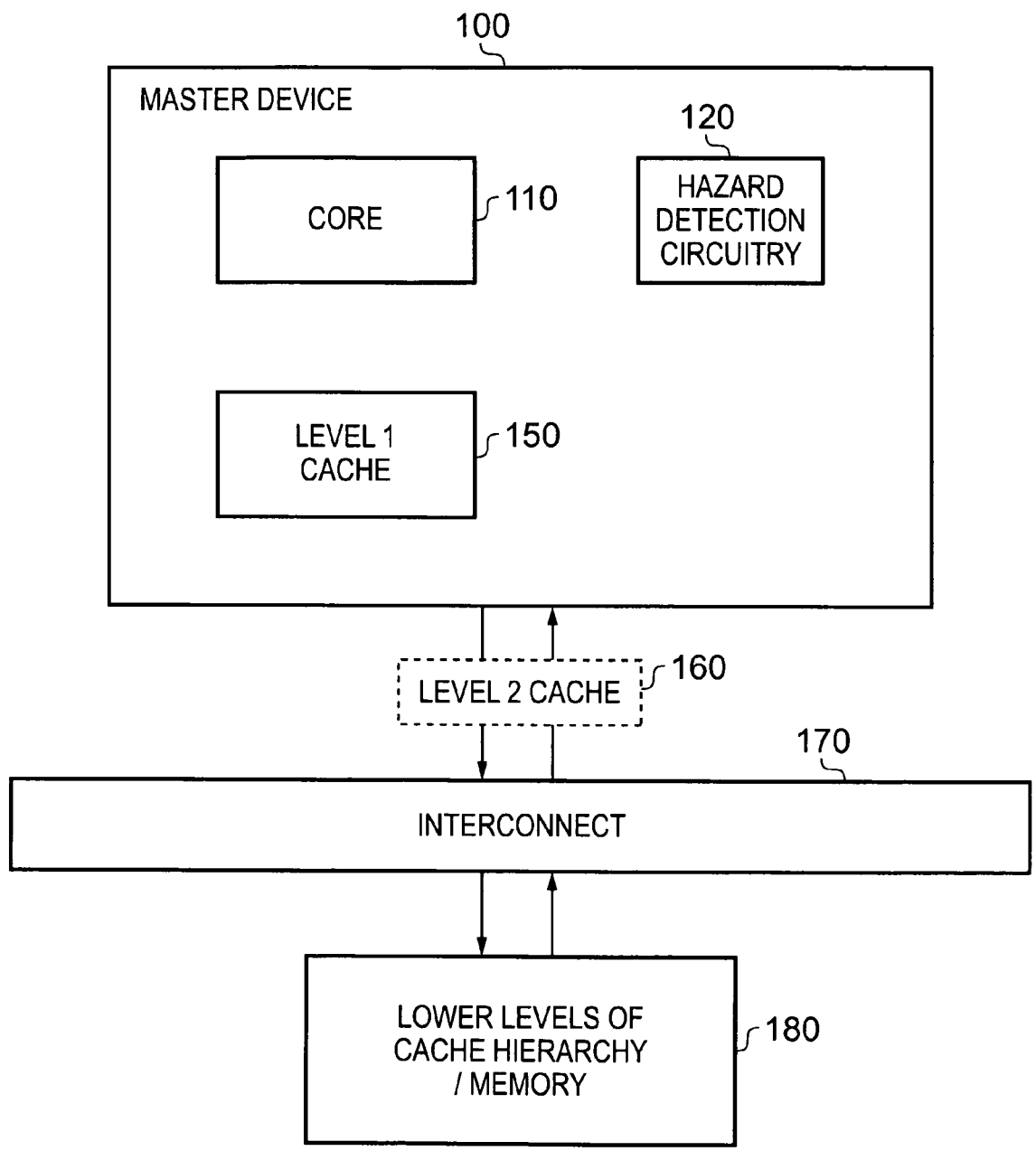
FIG. 8 schematically illustrates a data processing system in accordance with one embodiment of the present invention.

A further benefit of this technique can be realised when the processing circuitry has a storage structure associated therewith, and the processing circuitry needs to periodically perform an eviction process with respect to the storage structure which may result in the need to write evicted content to a slave device. The storage structure may take a variety of forms, but in one example could be a level one cache such as is illustrated within the data processing system of FIG. 8. In the example of FIG. 8, the master device 100 includes a processor core 110 and hazard detection circuitry 120 such as that discussed in more detail earlier with reference to FIG. 2. In addition, a level one cache 150 is provided in association with the processor core 110. As will be appreciated by those skilled in the art, at certain points in time it will be necessary to perform an eviction process with respect to the level one cache 150, such as when performing a linefill operation to the level one cache, or when performing various cache maintenance operations. Depending on the status of the cache line evicted from the level one cache, it may be necessary to write the contents of that cache line to a level two cache 160 or to a lower level of the cache hierarchy or main memory 180 coupled to the master device 100 by the interconnect 170. In FIG. 8, the level two cache 160 is drawn as a dotted box, since whilst it may reside between the master device 100 and the interconnect 170, it is possible in alternative embodiments for the level two cache to be incorporated within the components 180 coupled to the master device via the interconnect 170. Indeed, it will also be appreciated that in some embodiments there may be no level 2 cache.

One problem that occurs when performing such eviction processes is that it is not known whether the cache line to be evicted will be valid and dirty or not, nor is the address of the cache line to be evicted known, at the time the eviction process starts. To find this information out, the tag and/or dirty RAM within the level one cache 150 must be read, and this can take several cycles. If the cache line is dirty, then the address that was read from the tag RAM must be stored somewhere until a write access request can be issued relating to the data evicted from the cache line, and until details of that write access request can be added to the hazard buffers. This means that at the time the RAM read process starts at the beginning of the eviction process, it is not known whether there needs to be storage available to hold the cache line address or not. By the time the RAM read process completes several cycles later, it is then known if there needs to be storage, but if by that time there is no free storage available on that cycle, then the address would have to be discarded and the RAM read process performed again (consuming extra power and increasing the time taken to perform the eviction process) when there is storage available. One known technique for addressing this problem is to provide a dedicated eviction address buffer to hold the address, thus guaranteeing that there will be storage available when needed as nothing else is able to use that dedicated eviction address buffer. However, area is consumed in providing the dedicated eviction address buffer.

In accordance with embodiments of the present invention, the manner in which the hazard detection circuitry 120 operates can allow the same functionality to be achieved without the requirement to provide a dedicated eviction address buffer. In particular, in one embodiment, the process of FIG. 9 can be implemented.

Figure 9:
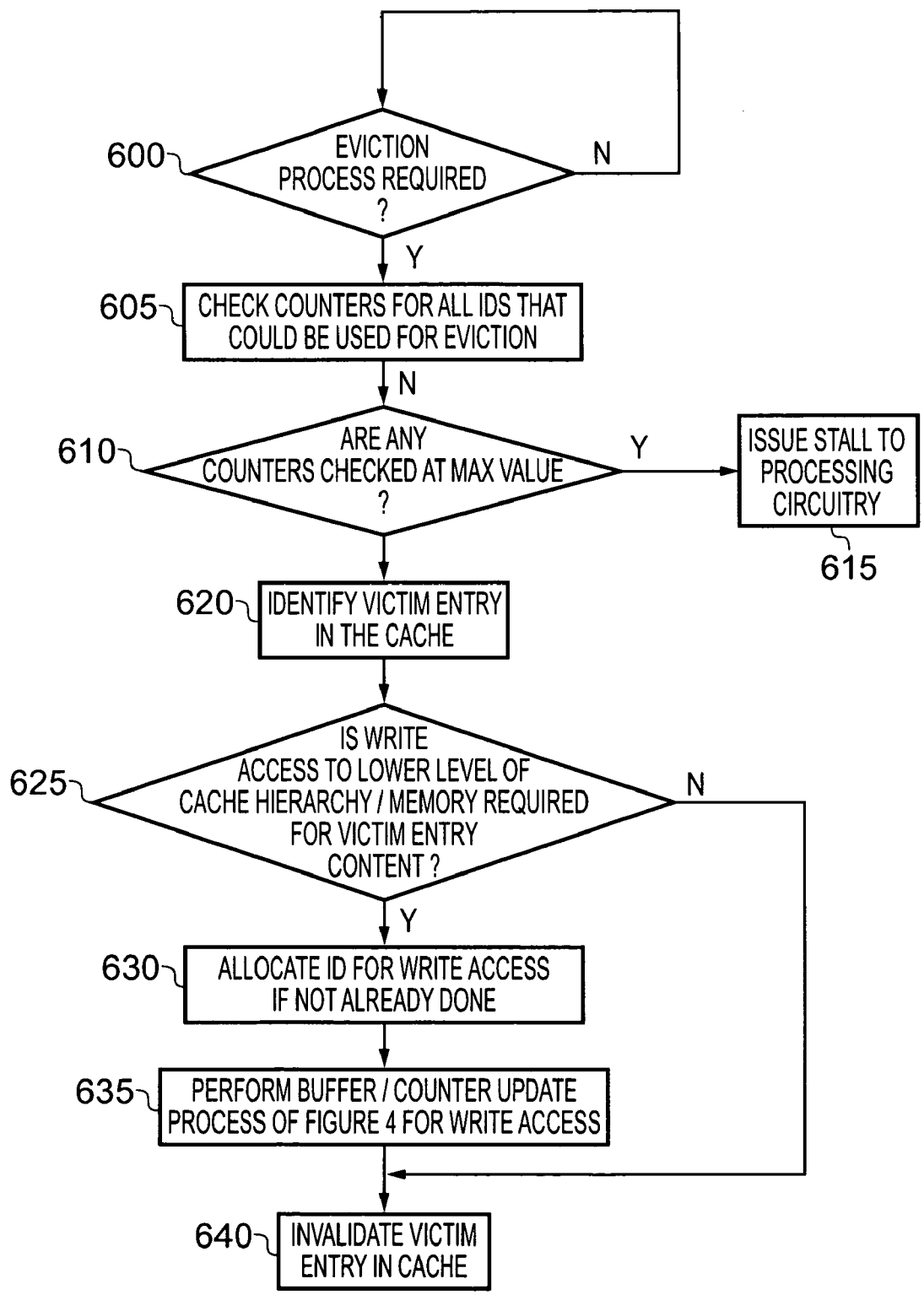
FIG. 9 is a flow diagram illustrating a process performed in accordance with one embodiment of the present invention when an eviction is required from the level one cache of FIG. 8.

As shown in FIG. 9, it is first determined at step 600 whether an eviction process is required. When an eviction process is required, then at step 605 the counters for all ID values that could be used for the eviction process are checked. This may involve checking all counters, or it may be that given knowledge of the addresses cached, and the ID values that are used for certain address ranges, only a subset of the counters need to be checked.

At step 610, it is then determined whether any of the checked counters are at a maximum value, and if so a stall signal is issued to the processing circuitry 615 causing the eviction process to be stalled and then later retried. If more than one eviction process can be supported in parallel, then the determination at step 610 can be modified such that for each counter the determination determines whether the current value of that counter plus any increments that would occur for other pending evictions would equal the maximum value, and if that condition is met then a stall signal is issued to the processing circuitry.

It is expected that the counters will only be at their maximum value quite rarely, and accordingly only infrequently will it be necessary to branch to step 615. It is also assumed that typically all of the buffers will store valid pending write access requests, and accordingly it is appropriate to proceed directly from step 600 to a review of the counters at step 605. However, in an alternative embodiment it could be first checked whether there is any free buffer that could be used to store details of the eviction write access request, and if such a free buffer was available, then there would be no need to check the counters. Instead, the process could proceed directly to step 620.

Assuming it is determined at step 610 that none of the checked counters are at the maximum value, then the process proceeds to step 620, where the eviction process is initiated, causing a victim entry in the cache to be identified. As discussed earlier, this step may take several clock cycles.

Once a victim entry in the cache has been identified, then it is determined at step 625 whether a write access to a lower level of the cache hierarchy or to main memory is required for the victim entry content. Typically this will be the case if the victim entry's contents are both valid and dirty. However, in some embodiments, such a write access request may be necessary even if the contents are not dirty, for example if the level one and level two caches are operated in an exclusive manner so that an item of content is only either in the level one cache or in the level two cache.

If no write access is required, then the process merely proceeds to step 640 where the victim entry in the cache is invalidated. However, if a write access is required, then an ID is allocated to that write access at step 630 if that allocation has not already been performed at the time the eviction process was initiated. Thereafter, the process proceeds to step 635 where the buffer/counter update process of FIG. 4 is performed for that write access request causing the storage structures 130 to be updated to include a record of that write access request, and for the write access request to subsequently be output from the master device 100.

Referring back to FIG. 4, it is expected that when step 320 is reached, the counter value will not be at its maximum level and indeed this can be ensured if the alternative formulation of step 320 discussed earlier is performed in respect of any write access request to be processed by the update circuitry 125 whilst the eviction process is taking place, and before the eviction write access requests is issued, i.e. if at step 320 the determination is whether the current value of the counter plus any increments that are due to take place due to cache evictions in progress is less than the maximum value. This will effectively cause any intervening write access requests to be stalled if they would cause the counter to reach its maximum value before the eviction process completes and the associated eviction write access request is issued. Alternatively, in some embodiments it may be sufficient to merely take the view that the counter is unlikely to reach its maximum value in that intervening period, and accordingly the determination of step 320 does not need to be modified to take account of pending eviction processes. In that event, if by the time the process of FIG. 4 is performed at step 635 of FIG. 9, the relevant counter has become full, then the eviction process will need to be reperformed following the issuance of the stall signal to the processing circuitry.

By virtue of the above described embodiment, it can be seen that in one embodiment it can be guaranteed that there will always be space to hold the result of the tag RAM lookup if an eviction write access request is needed, but if in fact it is determined that the cache line to be evicted is clean or is invalid, then none of the existing write address buffers need to be disturbed. This provides a particularly efficient mechanism for dealing with cache line evictions without the need to provide any dedicated eviction write address buffer.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus for coupling to one or more slave devices, the data processing apparatus comprising:
processing circuitry for issuing a series of access requests for handling by said one or more slave devices, said series of access requests including one or more write access requests, each write access request specifying a write operation to be performed by an addressed slave device from said one or more slave devices, and each issued write access request being a pending write access request until the write operation has been completed by the addressed slave device; and
hazard detection circuitry for detecting occurrence of at least one hazard condition in respect of the series of access requests issued by the processing circuitry;
said hazard detection circuitry comprising:
a pending write access history storage comprising at least one buffer and at least one counter for keeping a record of each pending write access request;
update circuitry, responsive to receipt of a write access request to be issued by the processing circuitry, to perform an update process to identify that write access request as a pending write access request in one of said at least one buffers and, if the identity of another pending write access request is overwritten by that update process, to increment a count value in said at least one counter;
on completion of each write access request by the addressed slave device, the update circuitry being arranged to perform a further update process to remove the record of that completed write access request from the pending write access history storage; and
hazard checking circuitry, responsive to at least a subset of the access requests to be issued by the processing circuitry, to reference the pending write access history storage in order to determine whether said at least one hazard condition occurs.

2. A data processing apparatus as claimed in claim 1, wherein:

said at least one buffer comprises a plurality of buffers, and said at least one counter comprises a plurality of counters.

3. A data processing apparatus as claimed in claim 1, wherein each write access request specifies a write address at which the write operation is to be performed by the addressed slave device, and the performance of said update process to identify a write access request as a pending write access request in one of said at least one buffers comprises storing at least the write address of that write access request in said one of said at least one buffers.

4. A data processing apparatus as claimed in claim 1, wherein:
   each counter in the pending write access history storage is associated with a group of access requests and is arranged to maintain a count value indicative of the number of pending write access requests in said group which are not identified in said at least one buffer; and
   the update circuitry is arranged when performing said update process:
   (i) to identify a free buffer from said at least one buffer and to store within said free buffer information identifying said write access request to be issued by the processing circuitry; and
   (ii) if all of said at least one buffers store information identifying a pending write access request at the time a free buffer is to be identified, then to select one of said at least one buffers to be said free buffer, to identify the group of access requests to which the current information stored in that selected free buffer belongs, and to increment the count value of the counter associated with that identified group.

5. A data processing apparatus as claimed in claim 4, wherein if it is determined that the count value of the counter associated with that identified group is at a maximum, then the processing circuitry is stalled from issuing said write access request.

6. A data processing apparatus as claimed in claim 4, wherein:
   the update circuitry is arranged when performing said further update process on completion of each write access request by the addressed slave device:
   (i) to identify the group of access requests to which the completed write access request belongs and to decrement the count value of the counter associated with that group if that count value is non-zero; or
   (ii) if the count value of the associated counter is zero, to invalidate the buffer storing the information identifying that completed write access request.

7. A data processing apparatus as claimed in claim 4, wherein:
   said at least one counter comprises a plurality of counters;
   each access request issued by the processing circuitry has an ID value associated therewith; and
   each group of access requests comprises those access requests having a particular ID value, such that said plurality of counters comprise a counter for each ID value.

8. A data processing apparatus as claimed in claim 7, wherein the information identifying a write access request as stored in each buffer comprises an indication of the ID value of that write access request.

9. A data processing apparatus as claimed in claim 8, wherein the information identifying a write access request as stored in each buffer further comprises an indication of a write address specified by said write access request and a valid field, the valid field being set when the information identifying said write access request is stored in the buffer during said update process, and being cleared to invalidate the buffer during said further update process performed on completion of said write access request.

10. A data processing apparatus as claimed in claim 1, wherein said hazard checking circuitry is responsive to a read access request to be issued by the processing circuitry, to reference the pending write access history storage in order to determine whether issuance of the read access request would cause a read after write (RAW) hazard condition to occur.

11. A data processing apparatus as claimed in claim 10, wherein the hazard checking circuitry is arranged to cause the processing circuitry to stall issuance of the read access request if said RAW hazard condition is determined to occur.

12. A data processing apparatus as claimed in claim 10, wherein the hazard checking circuitry is arranged to determine occurrence of the RAW hazard if either of the following conditions is determined:
   (a) a read address specified by the read access request matches a write address of a pending write access request identified in the at least one write access buffer;
   (b) the count value in said at least one counter indicates the presence of a pending write access request that is capable of specifying a write address matching said read address.

13. A data processing apparatus as claimed in claim 1, wherein said hazard checking circuitry is responsive to a write access request to be issued by the processing circuitry, to reference the pending write access history storage in order to determine whether issuance of the write access request would cause a write after write (WAW) hazard condition to occur, the update circuitry being arranged to perform the update process in respect of that write access request only if said WAW hazard is determined not to occur by the hazard checking circuitry.

14. A data processing apparatus as claimed in claim 13, wherein the hazard checking circuitry is arranged to cause the processing circuitry to stall issuance of the write access request if said WAW hazard condition is determined to occur.

15. A data processing apparatus as claimed in claim 13, wherein the hazard checking circuitry is arranged to determine occurrence of the WAW hazard if either of the following conditions is determined:
   (a) a write address specified by the write access request matches a write address of a pending write access request identified in the at least one write access buffer;
   (b) the count value in said at least one counter indicates the presence of a pending write access request that is capable of specifying a write address matching the write address specified by the write access request.

16. A data processing apparatus as claimed in claim 15, wherein each access request issued by the processing circuitry has an ID value associated therewith, and at said steps (a) and (b) the hazard checking circuitry determines that the WAW hazard does not occur if the pending write access request giving rise to the match has the same ID value as the write access request to be issued by the processing circuitry.

17. A data processing apparatus as claimed in claim 1, wherein the processing circuitry has a storage structure associated therewith, the processing circuitry being arranged to perform an eviction process with respect to the storage structure as a result of which evicted content of the storage structure needs to be written to one of said at least one slave devices, the processing circuitry being arranged to issue a write access request for said evicted content to cause a record of that write access request to be maintained by the pending write access history storage of the hazard detection circuitry.

18. A data processing apparatus as claimed in claim 17, wherein prior to performing said eviction process the pending write access history storage is referenced to ensure there is space to accommodate a record of the write access request to be issued for the evicted content.

19. A data processing apparatus as claimed in claim 17, wherein the storage structure is a cache.

20. A method of detecting occurrence of at least one hazard condition in respect of a series of access requests issued by processing circuitry for handling by one or more slave devices, said series of access requests including one or more write access requests, each write access request specifying a write operation to be performed by an addressed slave device from said one or more slave devices, and each issued write access request being a pending write access request until the write operation has been completed by the addressed slave device, the method comprising the steps of:

providing a pending write access history storage comprising at least one buffer and at least one counter for keeping a record of each pending write access request;

responsive to receipt of a write access request to be issued by the processing circuitry, performing an update process to identify that write access request as a pending write access request in one of said at least one buffers and, if the identity of another pending write access request is overwritten by that update process, to increment a count value in said at least one counter;

on completion of each write access request by the addressed slave device, performing a further update process to remove the record of that completed write access request from the pending write access history storage; and responsive to at least a subset of the access requests to be issued by the processing circuitry, referencing the pending write access history storage in order to determine whether said at least one hazard condition occurs.

21. A data processing apparatus for coupling to one or more slave device means, the data processing apparatus comprising:

processing means for issuing a series of access requests for handling by said one or more slave device means, said series of access requests including one or more write access requests, each write access request specifying a write operation to be performed by an addressed slave device means from said one or more slave device means, and each issued write access request being a pending write access request until the write operation has been completed by the addressed slave device means; and hazard detection means for detecting occurrence of at least one hazard condition in respect of the series of access requests issued by the processing means;

said hazard detection means comprising:

a pending write access history storage means comprising at least one buffer means and at least one counter means for keeping a record of each pending write access request;

update means, responsive to receipt of a write access request to be issued by the processing means, for performing an update process to identify that write access request as a pending write access request in one of said at least one buffer means and, if the identity of another pending write access request is overwritten by that update process, for incrementing a count value in said at least one counter means;

on completion of each write access request by the addressed slave device means, the update means for performing a further update process to remove the record of that completed write access request from the pending write access history storage means; and hazard checking means, responsive to at least a subset of the access requests to be issued by the processing means, for referencing the pending write access history storage means in order to determine whether said at least one hazard condition occurs.

* * * * *